(12) United States Patent
Tokunaga et al.

(10) Patent No.: US 9,074,270 B2
(45) Date of Patent: Jul. 7, 2015

(54) SINTERED CERMET AND CUTTING TOOL

(75) Inventors: Takashi Tokunaga, Satsumasendai (JP); Hideyoshi Kinoshita, Satsumasendai (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 1132 days.

(21) Appl. No.: 13/120,913

(22) PCT Filed: Sep. 28, 2009

(86) PCT No.: PCT/JP2009/066739
§ 371 (c)(1),
(2), (4) Date: Mar. 24, 2011

(87) PCT Pub. No.: WO2010/035824
PCT Pub. Date: Apr. 1, 2010

(65) Prior Publication Data
US 2011/0177934 A1 Jul. 21, 2011

(30) Foreign Application Priority Data

Sep. 26, 2008 (JP) ................................ 2008-247326
Sep. 26, 2008 (JP) ................................ 2008-247343

(51) Int. Cl.
*C22C 29/02* (2006.01)
*C04B 35/58* (2006.01)
*C04B 35/581* (2006.01)
*C22C 29/10* (2006.01)
*C22C 29/16* (2006.01)
*B22F 5/00* (2006.01)

(52) U.S. Cl.
CPC ........... *C22C 29/02* (2013.01); *B22F 2005/001* (2013.01); *B22F 2999/00* (2013.01); *C04B 35/58007* (2013.01); *C04B 35/58014* (2013.01); *C04B 35/581* (2013.01); *C04B 2235/3865* (2013.01); *C04B 2235/3873* (2013.01); *C04B 2235/3886* (2013.01); *C22C 29/10* (2013.01); *C22C 29/16* (2013.01)

(58) Field of Classification Search
USPC .......................................... 75/236, 238, 242
See application file for complete search history.

(56) References Cited

U.S. PATENT DOCUMENTS 5,670,726 A * 9/1997 Kolaska et al. ................. 75/237

FOREIGN PATENT DOCUMENTS

| JP | 63262444 A | 10/1988 |
|---|---|---|
| JP | 06-114609 | 4/1994 |
| JP | 07-096407 | 4/1995 |
| JP | 08-013077 | 1/1996 |
| JP | 08-176718 | 7/1996 |

OTHER PUBLICATIONS

Heiligers et al., "Crystal Structure of the binder phase in a model HfC—TiC—Ni material" Journal of Alloys and Compounds, vol. 453, No. 1-2, pp. 222-228, Mar. 6, 2008.
Extended European search report dated Oct. 12, 2012 issued in corresponding European application 09816238.1 cites the non-patent literature above.

* cited by examiner

*Primary Examiner* — George Wyszomierski
*Assistant Examiner* — Ngoclan T Mai
(74) *Attorney, Agent, or Firm* — Volpe and Koenig, P.C.

(57) ABSTRACT

A sintered cermet and a cutting tool are provided which have high toughness and high anti-chipping. The sintered cermet comprises a hard phase composed of one or more kinds selected from carbides, nitrides, and carbonitrides of one or more metals selected from metals belonging to Groups 4, 5, and 6 of the periodic table, each of which is composed mainly of Ti; and a binder phase composed mainly of Ni and Co. When the crystal lattice constant of the binder phase is measured by Pawley method, two kinds of binder phases having two kinds of crystal lattice constants B1 and B2 exist in the interior of the sintered cermet. Alternatively, two peaks belonging to the (220) plane of the hard phase, namely, a low-angle-side-peak and a high-angle-side peak are detected in the interior of the sintered cermet, and a modified part exists in the vicinity of the surface, in which three peaks belonging to the (220) plane of the hard phase, namely, the low-angle-side peak, an intermediate-position peak, and the high-angle-side peak are detected.

5 Claims, No Drawings

SINTERED CERMET AND CUTTING TOOL

CROSS-REFERENCE TO THE RELATED APPLICATIONS

This application is a national stage of international application No. PCT/JP2009/066739, filed on Sep. 28, 2009, and claims the benefit of priority under 35 USC 119 to Japanese Patent Application No. 2008-247326 filed on Sep. 26, 2008 and Japanese Patent Application No. 2008-247343 filed on Sep. 26, 2008, the entire contents of all of which are incorporated herein by reference.

TECHNICAL FIELD

The present invention relates to a sintered cermet, and a cutting tool made of the sintered cermet.

BACKGROUND ART

Sintered cermets are widely used as members requiring wear resistance, sliding properties, or chipping resistance, such as cutting tools, wear-resistant members, and sliding members. In these sintered cermets, developments of novel materials for improving their performance are pursued, and there are attempts to improve their characteristics.

For example, patent document 1 discloses that wear resistance, chipping resistance, and thermal shock resistance are improved by setting the value of the crystal lattice constant of a binder phase constituting the surface of a cermet cutting tool to be not less than 0.01 angstrom smaller than the value of crystal lattice constant of a binder phase constituting the interior of the cermet cutting tool.

Patent document 2 discloses a sintered cermet including a hard phase composed mainly of Ti, and a binder phase composed of an iron-group metal, and having three or more kinds of B1 type crystals in which their respective peak positions of the (113) plane in X-ray diffraction analysis are spaced 0.2 to 1.0 degree apart.

Patent document 3 discloses a sintered cermet in which in peaks of a large strength detected on a low angle side among peaks indicating a hard phase in X-ray diffraction analysis, the half width of a peak measured in the surface part of the sintered cermet is 40 to 60% of the X-ray diffraction peak of the interior thereof. FIGS. 3 and 4 illustrate the sintered cermet in which one peak of the (113) plane is detected in the surface part thereof, and two peaks of the (113) plane are detected in the interior thereof.

PRIOR ART DOCUMENTS

Patent Documents

Patent document 1: Japanese Unexamined Patent Publication No. 6-114609
Patent document 2: Japanese Unexamined Patent Publication No. 8-176718
Patent document 3: Japanese Unexamined Patent Publication No. 8-13077

SUMMARY OF THE INVENTION

Problems to be Solved by the Invention

However, the sintered cermet in which the lattice constant of the binder phase in the surface thereof is smaller than the lattice constant of the binder phase in the interior thereof, as in the case of the patent document 1, suffers from the problem that the toughness is insufficient and the chipping resistance is poor.

The sintered cermet having the three B1 structures spaced 0.2 to 1.0 degree apart, as in the case of the patent document 2, allows the hard phase to generate residual stress, thus improving the chipping resistance. However, when the cermet becomes a high temperature, there arises the following problem that these three peaks existing in the interior of the sintered cermet excessively increase the difference between the surface and the interior in terms of the residual stress remaining in the entire sintered cermet, thus deteriorating the thermal shock resistance in the surface of the sintered cermet.

When the two peaks of the hard phase exist in the interior of the alloy, and only one peak of the hard phase exists in the surface part, as in the case of the patent document 3, there is the risk that the residual stress of the hard phase in the surface part is excessively reduced, and the chipping resistance is poor, causing sudden fracture and chipping of the cutting edge.

Therefore, the present invention aims to improve the toughness and thermal shock resistance of the sintered cermet, and improve the chipping resistance of the cutting tool.

Means for Solving the Problems

A sintered cermet according to a first embodiment of the present invention includes a hard phase composed of one or more kinds of carbides, nitrides, and carbonitrides selected from among one or more kinds of metals in Groups 4, 5, and 6 of the periodic table, each of which is composed mainly of Ti; and a binder phase composed mainly of Co and Ni. When the crystal lattice constant of the binder phase is measured by Pawley method, two kinds of binder phases having two kinds of crystal lattice constants B1 and B2, respectively, exist in the interior of the sintered cermet.

Preferably, the difference between the B1 and the B2 is 0.01 Å or above, and the B1 is 3.575 Å or above and below 3.585 Å, and the B2 is 3.585 Å or above and 3.600 Å or below.

Preferably, the binder phase existing in the surface of the sintered cermet is the B1 alone.

In a cutting tool of the present invention, at least a cutting edge is composed of the sintered cermet, or the sintered cermet with a coating layer formed on the surface thereof.

A sintered cermet according to a second embodiment of the present invention includes a hard phase composed of one or more kinds of carbides, nitrides, and carbonitrides selected from among one or more kinds selected from metals belonging to Groups 4, 5, and 6 of the periodic table, each of which is composed mainly of Ti; and a binder phase composed mainly of at least one kind selected from among Co and Ni. When an X-ray diffraction measurement is carried out, two peaks belonging to the (220) plane of the hard phase, namely, a low angle side peak and a high angle side peak are detected in the interior of the sintered cermet. In a surface part of the sintered cermet, a modified part exists in which three peaks belonging to the (220) plane of the hard phase, namely, the low angle side peak, an intermediate position peak, and the high angle side peak are detected.

Preferably, in the peaks belonging to the (220) plane of the hard phase in the modified part, the low angle side peak and the intermediate position peak are detected at a diffraction angle 2θ and at positions spaced 0.2° or less apart, and the intermediate peak and the high angle side peak are detected at a diffraction angle 2θ and at positions spaced 0.3° to 0.5° apart.

Preferably, in the peaks belonging to the (220) plane of the hard phase in the modified part, the ratio (p1/p2) of a peak strength p1 of the low angle side peak to a peak strength p2 of the intermediate position peak is greater than 1.

Preferably, the high angle side peak among the peaks belonging to the (220) plane of the hard phase is vanished in the surface part of the sintered cermet.

Preferably, two peaks of the low angle side peak and the intermediate position peak are detected in the surface part, and the ratio (P1/P2) of a peak strength P1 of the low angle side peak to a peak strength P2 of the intermediate position peak is greater than 1.

The cutting tool of the present invention includes the sintered cermet, and has excellent chipping resistance and thermal shock resistance.

Effect of the Invention

In the sintered cermet according to the first embodiment of the present invention, the two kinds of binder phases having two kinds of crystal lattice constants B1 and B2 exist in the interior thereof. That is, these two kinds of binder phases having molecules of different sizes suppress the progress of cracks occurred in the sintered cermet, thus achieving excellent thermal shock resistance and chipping resistance.

In the sintered cermet according to the second embodiment of the present invention, when the X-ray diffraction measurement is carried out, the two peaks belonging to the (220) plane of the hard phase, namely, the low angle side peak and the high angle side peak are detected in the interior thereof. Further, in the vicinity of the surface thereof, the modified part exists in which the three peaks belonging to the (220) plane of the hard phase, namely, the low angle side peak, the intermediate position peak, and the high angle side peak are detected. The modified part can optimize the residual stress generated in the sintered cermet, thereby improving the thermal shock resistance and the chipping resistance of the sintered cermet.

PREFERRED EMBODIMENTS FOR CARRYING OUT THE INVENTION

A cutting tool (hereinafter referred to simply as "tool") as example of preferred embodiments of the sintered cermet of the present invention is described.

The sintered cermet constituting the tool includes a hard phase composed of one or more kinds of carbides, nitrides, and carbonitrides selected from among one or more kinds of metals in Groups 4, 5, and 6 of the periodic table, each of which is composed mainly of Ti; and a binder phase composed mainly of Co and Ni.

As a desired composition of the sintered cermet of the present invention, the ratio of total content of the nitrides or the carbonitrides of the metals in Groups 4, 5, and 6 of the periodic table, which constitute the hard phase and are composed mainly of Ti, is preferably 70 to 96% by mass, and particularly 85 to 96% by mass, in order to improve wear resistance. On the other hand, the ratio of the binder phase content is preferably 4 to 30% by mass, particularly 4 to 15% by mass, thereby achieving excellent balance between hardness and toughness of the sintered cermet.

A desired specific composition of the sintered cermet is obtained in the following proportions: 5 to 15% by mass of Co; 2 to 10% by mass of Ni; 40 to 60% by mass of TiCN; 5 to 30% by mass of WC; 5 to 30% by mass of NbC; 1.0 to 3.0% by mass of VC; 0 to 5% by mass of MoC; 0 to 10% by mass of TaC; and 0 to 3.0% by mass of ZrC. This compatibly satisfies the wear resistance and the chipping resistance of the sintered cermet.

A first embodiment of the present invention has a key feature that, when the crystal lattice constant of the binder phase is measured by Pawley method, two kinds of binder phases having two kinds of crystal lattice constants B1 and B2 exist in the interior of the sintered cermet. This suppresses the progress of cracks occurred in the sintered cermet, achieving excellent thermal shock resistance and chipping resistance.

The crystal lattice constant of the binder phase is measured under the following conditions:
X-ray diffraction analysis: 2θ=20°-100°, CuK$_\alpha$ ray
Analysis method: WPPD (Pawley method)
Profile function: Fundamental Parameter
Crystal phase used in the analysis: Co, Cubic crystal, a=3.54470 Å

When the crystal lattice constant of the binder phase is measured in the present invention, the measurement is carried out on a flat surface of the sintered cermet in order to enhance the measurement accuracy. Here, the interior of the sintered cermet in the present invention is defined as being located 0.5 mm or more inside the surface of the sintered cermet.

It is preferable that the difference between the B1 and the B2 is 0.01 Å or above, and the B1 is 3.575 Å or above and below 3.585 Å, and the B2 is 3.585 Å or above and 3.600 Å or below. This increases the difference in lattice constant between the B1 and the B2, so that the binder phase with the advanced solid-state dissolution of tungsten (W), and a high temperature stable phase of cubic crystal system (fcc) structure exist while retaining their respective characteristics. As a result, more deflection effect on cracks occurred, and the enhancement of solid-state dissolution of the binder phase are achieved, thus improving chipping resistance.

Preferably, the binder phase existing in the surface of the sintered cermet is the B1 alone. Thereby, the solid-state dissolution of the hard phase in the surface thereof is more advanced than that in the interior thereof, and the hardness is improved in the surface of the sintered cermet, thus improving the wear resistance in the surface of the sintered cermet.

The hard phase consists of a first hard phase observed relatively black, and a second hard phase observed relatively white in a scanning electron microscope (SEM) photograph of an optional cross section of the interior thereof. In the cross-sectional observation in the interior of the sintered cermet, the first hard phase preferably has a mean particle diameter of 0.1 to 0.5 μm, and the second hard phase preferably has a mean particle diameter of 0.8 to 1.5 μm, in order to enhance toughness. In the present invention, the particle diameter of the hard phase is measured according to the method of measuring the mean particle diameter of cemented carbide as prescribed in CIS-019D-2005. When the hard phase has a core-containing structure, the region extending to the outer edge of a peripheral part, including a core part and the peripheral part, is regarded as a single hard phase, and the particle diameter thereof is measured.

According to a second embodiment of the present invention, when an X-ray diffraction measurement is carried out, two peaks belonging to the (220) plane of the hard phase, namely, a low angle side peak and a high angle side peak are detected in the interior. Further, in the vicinity of the surface, a modified part exists in which three peaks belonging to the (220) plane of the hard phase, namely, the low angle side peak, an intermediate position peak, and the high angle side peak are detected. The modified part can optimize the residual stress generated in the sintered cermet, thus improving the thermal shock resistance and the chipping resistance of the sintered cermet.

The X-ray diffraction measurement in the present invention is carried out on a polished surface obtained by polishing the cross section of the sintered cermet, under the following measurement conditions: Ray source: CuKα (Kα2 is removed); Spot diameter: 100 μm or below; Output: 40 kV, 40 mA; Step: 0.016°; Measurement peak: TiN (220) crystal plane (a diffraction angle 2θ is detected in the vicinity of 60 to 65°). The presence or absence of a modified layer, and the detected states of X-ray diffraction peaks in a surface part can be observed by irradiating X-rays and measuring while shifting the measuring position from the interior of the sintered cermet to the surface thereof.

The differences in the X-ray diffraction peaks detected in the interior, the modified part, and the surface part in the sintered cermet of the present invention seem to be caused by the existence of three kinds of hard phases where the solid solution states of a plurality of elements are different from each other, and by different existence ratios thereof. It is estimated that the sintering in the modified part and in the surface part proceeds more than that in the interior, and the elements diffuse and move actively, resulting in different existence states of these hard phases.

With regard to the three peaks belonging to the (220) plane of the hard phase in the modified part, the low angle side peak and the intermediate position peak are preferably detected at the diffraction angle 2θ and at positions spaced 0.2° or less apart, and the intermediate peak and a peak detected on the high angle side are preferably detected at the diffraction angle 2θ and at positions spaced 0.3° to 0.5° apart, because the solid-state solution of the hard phase in the modified layer sufficiently proceeds to achieve high hardness thereof, and because a large residual stress can be imparted to the modified part, thereby providing excellent chipping resistance in the surface of the sintered cermet. In these three peaks in the modified part, the ratio (p1/p2) of a peak strength p1 of the low angle side peak to a peak strength p2 of the intermediate position peak is preferably greater than 1, in order to enhance the residual stress of the modified part.

In the surface part, the high angle side peak among the peaks belonging to the (220) plane of the hard phase is preferably vanished because the wear resistance in the surface of the sintered cermet can be improved.

Additionally, in the surface part, two peaks belonging to the (220) plane of the hard phase are preferably detected, and the ratio (P1/P2) of a peak strength P1 of the low angle side peak to a peak strength P2 of the intermediate position peak is preferably greater than 1, in order to improve the residual stress of the surface part.

In a scanning electron microscope (SEM) photograph of an optional cross section of the interior, a first hard phase observed relatively black, and a second hard phase observed relatively white are observed as the hard phase. In consideration of the mass of elements and atomic radii, it is conjectured that the peak detected on the high angle side in the X-ray diffraction corresponds to the first hard phase, and the peak detected in the middle, and the peak detected on the low angle side correspond to the second hard phase. At this time, it is difficult to distinguish the difference between the hard phase of the peak detected in the middle, and the hard phase of the peak detected on the low angle side, based on the scanning electron microscope (SEM) photograph.

In the cross-sectional observation of the interior of the sintered cermet, the first hard phase preferably has a mean particle diameter of 0.1 to 0.5 μm, and the second hard phase preferably has a mean particle diameter of 0.8 to 1.5 μm, in order to enhance the toughness. The particle diameters of the hard phase in the present invention are measured according to the method of measuring the mean particle diameter of cemented carbide as prescribed in CIS-019D-2005. When the hard phase has a core-containing structure, the region extending to the outer edge of a peripheral part, including a core part and the peripheral part, is regarded as a single hard phase, and the particle diameter thereof is measured.

The tool may be obtained by forming a known coating layer of, such as TiN, TiCN, TiAlN, $Al_2O_3$, or the like, on a surface of the sintered cermet by using a known method, such as physical vapor deposition method (PVD method), or chemical vapor deposition method (CVD method). Examples of a specific coating layer construction include TiN, TiCN, TiAlN, and $Al_2O_3$, In particular, $Ti_{1-a-b-c-d}Al_aW_bSi_cM_d(C_xN_{1-x})$ is preferred, wherein M is one or more kinds selected from among Nb, Mo, Ta, Hf, and Y, $0.45 \leq a \leq 0.55$, $0.01 \leq b \leq 0.1$, $0 \leq c \leq 0.05$, $0 \leq d \leq 0.1$, and $0 \leq x \leq 1$, because the residual stress in the surface of the sintered cermet can fall within an optimal range, and the hardness of the coating layer itself is high, thus improving the wear resistance.

The sintered cermet of the present invention is applicable to general turning tools of throw-away tip type, grooving tools, thread cutting tools, and milling tools, such as end mills, drills, solid end mills, and solid drills, and is also applicable to wear-resistant members and sliding members.

(Manufacturing Method)

Next, an example of the method of manufacturing the sintered cermet is described.

Firstly, a mixed powder is prepared by mixing TiCN powder having a mean particle diameter of 0.6 to 1.0 μm, preferably 0.8 to 1.0 μm, one kind of powder having a mean particle diameter of 0.1 to 2 μm, selected from among carbonate powders, nitride powders, and carbonitride powders of other metals in Groups 4, 5, and 6 of the periodic table described above, Co powder having a mean particle diameter of 1.0 to 3.0 μm, Ni powder having a mean particle diameter of 0.3 to 0.8 μm, and $MnCO_3$ powder having a mean particle diameter of 0.5 to 10 μm if desired. In some cases, TiC powder or TiN powder may be added into raw materials. These raw material powders constitute TiCN in the sintered cermet after sintering. When the mean particle diameter of the TiCN powder is outside the range described above, and when the mean particle diameter of the Ni powder is outside the range described above, two kinds of binder phases having the lattice constants B1 and B2 cannot be generated.

Subsequently, binder is added to the mixed powder, and is formed into a predetermined shape by a known forming method, such as press forming, extrusion forming, injection forming, or the like.

According to the present invention, the cermet of a predetermined structure described in the first embodiment can be manufactured by sintering the formed body under the following conditions. The sintering conditions are as follows, and the sintering is carried out in a sintering pattern in which the following steps (a) to (g) are carried out sequentially:

(a) Increasing temperature under vacuum from room temperature to 1200° C.;

(b) Increasing the temperature under vacuum at a heating rate $r_1$ of 0.1 to 2° C./min from 1200° C. to a sintering temperature T1 of 1330 to 1380° C.;

(c) Changing, at the temperature T1, the atmosphere within a sintering furnace into an inert gas atmosphere of 0.1 MPa to 0.9 MPa, and increasing the temperature at a heating rate $r_2$ of 4 to 15° C./min from the temperature T1 to a sintering temperature T2 of 1450 to 1600° C.;

(d) Retaining the temperature T2 for 0.5 to 2 hours in the inert gas atmosphere of 0.1 MPa to 0.9 MPa;

(e) Changing the atmosphere in the furnace into vacuum while holding the sintering temperature, and retaining it for 60 to 90 minutes;

(f) Performing vacuum cooling from the temperature T2 to 1100° C. at a cooling rate of 4 to 15° C./min in a vacuum atmosphere whose degree of vacuum is 0.1 to 3 Pa; and (g) When the temperature is decreased to 1100° C., performing rapid cooling to room temperature by admitting an inert gas at a gas pressure of 0.05 MPa to 0.9 MPa.

That is, among these sintering conditions, if the entire atmosphere in the step (d) is changed into vacuum or a low pressure gas atmosphere of 0.1 MPa or below, or is changed into an inert gas atmosphere having a gas pressure of 0.9 MPa or above, the two kinds of binder phases cannot be generated.

According to the present invention, the sintered cermet in the second embodiment having the predetermined structure described above can be manufactured by the sintering the above formed body under the following conditions. The sintering conditions are as follows, and the sintering is carried out in a sintering pattern in which the following steps (h) to (l) are carried out sequentially:

(h) Increasing temperature to 10.50 to 1250° C. at a heating rate of 5 to 15° C./min;

(i) Increasing the temperature to 1330 to 1380° C. at a heating rate of 0.1 to 2° C./min in an atmosphere filled with nitrogen (N) at 30 to 2000 Pa;

(j) Increasing the temperature to 1400 to 1500° C. at a heating rate of 4 to 15° C./min in the atmosphere filled with nitrogen (N) at 30 to 2000 Pa, and retaining in this state for 0.5 to 1.0 hour;

(k) Changing from vacuum into a nitrogen atmosphere, and increasing the temperature to a temperature that is 50 to 100° C. higher than 1500° C. at a heating rate of 4 to 15° C./min, and retaining at the highest temperature in vacuum atmosphere for 0.5 to 1.0 hour; and (l) Cooling in an inert gas atmosphere at a cooling rate of 6 to 15° C./min.

If the step (j) is carried out in a vacuum atmosphere, the solid solution state into the hard phase proceeds excessively, resulting in three X-ray diffraction peaks in the interior of the sintered cermet. If the step (j) is carried out in atmosphere at a nitrogen pressure of higher than 2000 Pa, the solid solution state into the hard phase is suppressed excessively, failing to form the modified layer. If the heating rate in the step (k) is below 4° C./min, the solid-state dissolution of the elements in Groups 4, 5, and 6 of the periodic table into the hard phase becomes excessive in the surface part of the sintered cermet 2, and three X-ray peaks of the hard phase are detected in the interior of the sintered cermet. If the heating rate is above 15'C/rain, the solid-state dissolution of the elements in Groups 4, 5, and 6 of the periodic table into the hard phase does not take place, failing to obtain the modified layer of the present invention. If the temperatures in the steps (j) and (k) are outside the predetermined range, the solid solution state into the hard phase cannot be optimized, resulting in three X-ray diffraction peaks in the interior of the sintered cermet, or failing to obtain the modified layer.

Then, if desired, a coating layer is formed on a surface of a tip 1. As a method of forming the coating layer, physical vapor deposition (PVD) methods, such as ion plating method and sputtering method, are applicable.

Example 1

A mixed powder was prepared by blending, in the proportions shown in Table 1, TiCN powder, Ni powder, and Co powder, each having a particle diameter shown in Table 1, WC powder having a mean particle diameter of 1.1 μm, TiN powder having a mean particle diameter of 0.8 μm, VC powder having a mean particle diameter of 1.0 μm, TaC powder having a mean particle diameter of 2 μm, $Mo_2C$ powder having a mean particle diameter of 1.5 μm, NbC powder having a mean particle diameter of 1.5 μm, ZrC powder having a mean particle diameter of 1.8 μm, and $MnCO_3$ powder having a mean particle diameter of 5.0 μm. Using a ball mill made of stainless steel, and cemented balls, the mixed powder was wet mixed by adding isopropyl alcohol (IPA), and was then mixed by adding 3% by mass of paraffin.

Thereafter, this mixture was press-formed into a throw-away tip tool shape of CNMG120408 at an applied pressure of 200 MPa. Cermet throw-away tips of Samples Nos. I-1 to I-13 were respectively obtained through the following steps: (a) Increasing temperature from room temperature to 1200° C. at 10° C./min under vacuum whose degree of vacuum was 10 Pa; (b) Increasing the temperature at a heating rate $r_1$=0.8° C./min from 1200° C. to 1350° C. (a sintering temperature T1) again under vacuum whose degree of vacuum was 10 Pa; (c) Increasing the temperature at a heating rate $r_2$=7° C./min in the sintering atmosphere shown in Table 2, from 1350° C. (the temperature T1) to a sintering temperature T2 shown in Table 2; (d) Retaining at the sintering temperature T2 in the same sintering atmosphere as the step (c), for a sintering time t1 in Table 2; (e) Retaining under vacuum whose degree of vacuum was 10 Pa, at the sintering temperature T2 for a sintering time t2 shown in Table 2; (f) Cooling under vacuum from the temperature T2 to 1100° C. at a cooling rate 8° C./min; and (g) Performing rapid cooling from 1100° C. to room temperature in an Ar gas atmosphere of 0.1 MPa.

TABLE 1

| | | | | | | | | | | | | | | |
|---|---|---|---|---|---|---|---|---|---|---|---|---|---|---|
| | Material composition (mass %) | | | | | | | | | | | | | |
| | TiCN | | Ni | | Co | | | | | | | | | |
| Sample No. | Mass % | Particle diameter (μm) | Mass % | Particle diameter (μm) | Mass % | Particle diameter (μm) | TiN | WC | TaC | $Mo_2C$ | NbC | ZrC | VC | $MnCO_3$ |
| I-1 | Balance | 0.9 | 4 | 0.8 | 8 | 1 | 12 | 15 | 0 | 0 | 10 | 0.2 | 1.5 | 1 |
| I-2 | Balance | 0.6 | 5 | 0.8 | 10 | 1.5 | 12 | 18 | 1 | 0 | 0 | 0.2 | 2.0 | 0 |
| I-3 | Balance | 0.8 | 6 | 0.5 | 8 | 1.5 | 6 | 12 | 0 | 5 | 8 | 0.2 | 2.0 | 1.5 |
| I-4 | Balance | 0.8 | 2 | 0.5 | 7 | 1 | 3 | 12 | 0 | 0 | 12 | 0.3 | 1.6 | 1 |
| I-5 | Balance | 1.0 | 3.5 | 0.3 | 7.5 | 1.5 | 12 | 15 | 0 | 0 | 9 | 0.2 | 1.9 | 1 |
| I-6 | Balance | 1.2 | 3 | 0.3 | 8 | 1.5 | 10 | 15 | 0 | 2 | 10 | 0.3 | 1.9 | 0.5 |
| *I-7 | Balance | 0.5 | 4 | 0.5 | 7.5 | 1.1 | 12 | 16 | 0 | 0 | 10 | 0.2 | 1.0 | 1.5 |
| *I-8 | Balance | 1.6 | 3 | 0.5 | 8 | 1 | 12 | 16 | 0 | 0 | 10 | 0.2 | 2.4 | 1 |
| *I-9 | Balance | 0.5 | 3 | 0.3 | 7 | 1 | 8 | 18 | 3 | 0 | 11 | 1.0 | 0.0 | 0 |

TABLE 1-continued

| | Material composition (mass %) | | | | | | | | | | | | | |
|---|---|---|---|---|---|---|---|---|---|---|---|---|---|---|
| | TiCN | | Ni | | Co | | | | | | | | | |
| Sample No. | Mass % | Particle diameter (μm) | Mass % | Particle diameter (μm) | Mass % | Particle diameter (μm) | TiN | WC | TaC | Mo$_2$C | NbC | ZrC | VC | MnCO$_3$ |
| *I-10 | Balance | 0.8 | 2 | 0.2 | 6 | 1.5 | 12 | 14 | 3 | 0 | 8 | 0.1 | 2.0 | 0 |
| *I-11 | Balance | 0.7 | 4 | 0.9 | 12 | 1.5 | 8 | 14 | 3 | 0 | 8 | 0.2 | 2.0 | 1 |
| *I-12 | Balance | 1.0 | 3 | 0.5 | 7 | 1 | 5 | 15 | 1 | 1 | 9 | 0.3 | 1.3 | 0.5 |
| *I-13 | Balance | 1.0 | 4 | 0.5 | 10 | 1.5 | 10 | 11 | 1 | 1 | 9 | 0.2 | 1.5 | 1 |

Mark* indicates sample out of range of this invention.

TABLE 2

| | Step (c) | | | Step (d) | | | Step (e) |
|---|---|---|---|---|---|---|---|
| Sample No. | Sintering temperature T$_2$ (° C.) | Sintering atmosphere Gas | Pressure (MPa) | Sintering atmosphere Gas | Pressure (MPa) | Sintering time t$_1$ (hr) | Sintering time t$_2$ (hr) |
| I-1 | 1525 | N$_2$ | 0.5 | N$_2$ | 0.5 | 0.6 | 1.1 |
| I-2 | 1550 | Ar | 0.1 | Ar | 0.1 | 0.6 | 1.4 |
| I-3 | 1550 | N$_2$ | 0.7 | N$_2$ | 0.7 | 0.6 | 1.0 |
| I-4 | 1575 | N$_2$ | 0.3 | N$_2$ | 0.3 | 1.1 | 1.5 |
| I-5 | 1575 | N$_2$ | 0.9 | N$_2$ | 0.9 | 1.1 | 1.3 |
| I-6 | 1550 | N$_2$ | 0.8 | N$_2$ | 0.8 | 0.3 | 1.2 |
| *I-7 | 1550 | N$_2$ | 0.2 | N$_2$ | 0.2 | 0.6 | 0.4 |
| *I-8 | 1575 | N$_2$ | 0.1 | N$_2$ | 0.1 | 0.6 | 0.6 |
| *I-9 | 1525 | N$_2$ | 0.1 | Vacuum | | 1.1 | 1.1 |
| *I-10 | 1525 | N$_2$ | 0.05 | N$_2$ | 0.8 | 1.2 | 0.6 |
| *I-11 | 1500 | He | 0.1 | N$_2$ | 0.04 | 0.9 | 1.2 |
| *I-12 | 1575 | N$_2$ | 0.1 | N$_2$ | 2.3 | 0.9 | 1.3 |
| *I-13 | 1575 | N$_2$ | 1 | N$_2$ | 0.9 | 1.1 | 1.5 |

Mark* indicates sample out of range of this invention.

The flank face of each of these obtained cermet throw-away tips was ground 0.5 mm in thickness into a mirror surface state, and the crystal lattice constant number in the interior of the cermet was measured under the following conditions.

X-ray diffraction analysis: 2θ=20°-100°, CuK$_α$ ray, using an ADVANCE apparatus manufactured by Bruker AXS Inc.
Analysis method: WPPD: Pawley method
Analysis software: TOPAS
Profile function: Fundamental Parameter
Crystal phase used in the analysis: Co, cubic crystal system, a=3.54470 Å

Similarly, a region on the surface of the sintered body was subjected to the X-ray diffraction analysis, and the lattice constant on the surface of the cermet was measured. The results were shown in Table 3.

Next, cutting tests using these obtained cermet throw-away tips were conducted under the following cutting conditions. The results were also shown in Table 3.

(Wear Resistance Evaluation)
Workpiece: SCM435
Cutting speed: 200 m/min
Feed rate: 0.20 mm/rev
Depth of cut: 1.0 mm
Cutting state: Wet (using water-soluble cutting fluid)
Evaluation method: Time elapsed until the amount of wear reached 0.2 mm (Chipping Resistance Evaluation)
Workpiece: S45C
Cutting speed: 120 m/min
Feed rate: 0.05 mm/rev or more
Depth of cut: 1.5 mm
Cutting state: Dry
Evaluation method: Time (sec) elapsed until chipping occurred by each feed rate 10 S

TABLE 3

| | Lattice constant of Co (Å) | | | | | | Cutting properties | |
|---|---|---|---|---|---|---|---|---|
| | Interior | | | Surface | | | Chipping resistance | Wear resistance |
| Sample No. | B1 | B2 | B1 − B2 | B1 | B2 | B1 − B2 | (sec.) | (min.) |
| I-1 | 3.574 | 3.585 | 0.011 | 3.574 | — | — | 91 | 79 |
| I-2 | 3.579 | 3.585 | 0.006 | 3.579 | — | — | 94 | 85 |
| I-3 | 3.575 | 3.598 | 0.023 | 3.584 | — | — | 95 | 93 |
| I-4 | 3.570 | 3.581 | 0.011 | 3.576 | 3.589 | 0.013 | 85 | 71 |

TABLE 3-continued

| Sample No. | Lattice constant of Co (Å) | | | | | | Cutting properties | |
|---|---|---|---|---|---|---|---|---|
| | Interior | | | Surface | | | Chipping resistance (sec.) | Wear resistance (min.) |
| | B1 | B2 | B1 − B2 | B1 | B2 | B1 − B2 | | |
| I-5 | 3.588 | 3.599 | 0.011 | 3.596 | 3.795 | 0.199 | 88 | 75 |
| I-6 | 3.570 | 3.582 | 0.012 | 3.570 | 3.582 | 0.012 | 81 | 82 |
| *I-7 | 3.580 | — | — | — | 3.581 | — | 25 | 42 |
| *I-8 | 3.569 | — | — | — | 3.570 | — | 31 | 35 |
| *I-9 | 3.583 | — | — | 3.585 | — | — | 38 | 32 |
| *I-10 | 3.610 | — | — | 3.610 | — | — | 19 | 49 |
| *I-11 | 3.569 | — | — | 3.569 | — | — | 22 | 45 |
| *I-12 | 3.572 | — | — | 3.572 | — | — | 34 | 33 |
| *I-13 | — | 3.582 | — | — | 3.582 | — | 26 | 39 |

Mark* indicates sample out of range of this invention.

It was noted from Tables 1 to 3 that each of Samples Nos. I-1 to I-6, in which two kinds of binder phases having two kinds of crystal lattice constants B1 and B2 in the interior of the sintered cermet, had excellent wear resistance and excellent chipping resistance.

On the contrary, each of Samples Nos. I-7 to I-13, in which only the binder phase having only one kind of lattice constant existed in the interior of the sintered cermet, had poor wear resistance and poor chipping resistance.

Example 2

Cermet tools of Samples Nos. II-1 to II-13 were manufactured by forming a hard layer having a film construction in Table 4, on the sintered cermet in Example 1, by using arc ion plating method under film forming conditions in Table 4.

Cutting tests using these obtained cermet cutting tools were conducted under the following cutting conditions. The results were collectively shown in Table 4.
(Wear Resistance Evaluation)
Workpiece: SCM435
Cutting speed: 250 m/min
Feed rate: 0.25 mm/rev
Depth of cut: 1.0 mm
Cutting state: Wet (using water-soluble cutting fluid)
Evaluation method: Time elapsed until the amount of wear reached 0.2 mm (Chipping Resistance Evaluation)
Workpiece: S45C
Cutting speed: 150 m/min
Feed rate: 0.05 mm/rev or more
Depth of cut: 2.0 mm
Cutting state: Dry
Evaluation method: Time (sec) elapsed until chipping occurred by each feed rate 10 S

TABLE 4

| Sample No. | Coating layer (Coating layer A) | | Layer thickness (µm) | Cutting properties | |
|---|---|---|---|---|---|
| | Composition | | | Chipping resistance (sec.) | Wear resistance (min.) |
| II-1 | $Ti_{0.5}Al_{0.5}N$ | TiN | 2.0 | 100 | 96 |
| II-2 | $Ti_{0.42}Al_{0.48}W_{0.04}Si_{0.03}Nb_{0.03}N$ | — | 3.0 | 100 | 101 |
| II-3 | $Ti_{0.46}Al_{0.49}W_{0.02}Si_{0.01}Nb_{0.02}N$ | $Ti_{0.42}Al_{0.49}Nb_{0.09}N$ | 3.0 | 100 | 112 |
| II-4 | TiCN | — | 3.0 | 95 | 94 |
| II-5 | $Ti_{0.50}Al_{0.50}N$ | — | 1.0 | 97 | 93 |
| II-6 | $Ti_{0.40}Al_{0.40}Cr_{0.20}N$ | — | 4.0 | 93 | 95 |
| *II-7 | $Ti_{0.46}Al_{0.49}Si_{0.03}Nb_{0.02}N$ | — | 5.0 | 35 | 56 |
| *II-8 | TiCN | — | 3.0 | 34 | 41 |
| *II-9 | $Ti_{0.50}Al_{0.50}N$ | — | 1.0 | 34 | 47 |
| *II-10 | $Ti_{0.40}Al_{0.40}Cr_{0.20}N$ | — | 4.0 | 21 | 55 |
| *II-11 | $Ti_{0.42}Al_{0.48}W_{0.04}Si_{0.03}Nb_{0.03}N$ | — | 4.0 | 17 | 53 |
| *II-12 | $Ti_{0.42}Al_{0.48}W_{0.04}Si_{0.03}Nb_{0.03}N$ | — | 4.0 | 28 | 42 |
| *II-13 | $Ti_{0.46}Al_{0.49}Si_{0.03}Cr_{0.02}N$ | — | 1.0 | 21 | 44 |

Mark* indicates sample out of range of this invention.

It was noted from Table 4 that, in Samples Nos. II-7 to II-13, each having residual stress outside the range of the present invention, the toughness of the tools was not sufficient, and chipping of the cutting edge and sudden fracture of the cutting edge occurred early, failing to obtain satisfactory tool life. On the other hand, Samples Nos. II-1 to II-6 within the range of the present invention had high toughness, and the edge of the blade caused no chipping, thereby exhibiting excellent tool life.

Example 3

A mixed powder was prepared by blending, in the proportions shown in Table 5, TiCN powder having a mean particle diameter ($d_{50}$ value) of 0.6 µm, TiN powder having a mean particle diameter of 1.5 µm, Ni powder having a mean particle diameter of 2.4 µm, and Co powder having a mean particle diameter of 1.9 µm (These mean particle diameters were based on the measurement by micro track method); the WC powder, the VC powder, the TaC powder, the $Mo_2C$ powder, the NbC powder, the ZrC powder (These powders were used in Example 1); and MnCO$_3$ powder having a mean particle diameter of 5.0 μm. The mixed powder was mixed and formed similarly to Example 1.

Thereafter, cermet throw-away tips of Samples Nos. III-1 to III-16 were respectively obtained through the following steps: (h) Increasing temperature to 1200° C. at a heating rate 10° C./min; (i) Increasing the temperature to 1350° C. at a heating rate 1° C./min, followed by sintering under sintering conditions shown in Table 6; and (l) Cooling at a cooling rate of 10° C./min in a nitrogen gas atmosphere.

Thereafter, a peak chart was obtained by conducting X-ray diffraction analysis under the following conditions: Measurement range: 2θ=60°-63°, CuK$_\alpha$ ray (Kα1 was removed); and Crystal phase used in the analysis: TiCN (220). Similarly, the X-ray diffraction analysis was conducted on a region in the surface of each sintered body. An oblique polishing was carried out at an angle of 3° from the surface of the sintered body. An X-ray diffraction measurement on the polished surface was carried out, and a region where a modified part exists was examined by converting the polished surface into a depth direction. The modified part existed at a position having a

TABLE 5

| Sample No. | Material composition (mass %) | | | | | | | | | | |
|---|---|---|---|---|---|---|---|---|---|---|---|
| | TiCN | TiN | WC | TaC | Mo$_2$C | NbC | ZrC | VC | Ni | Co | MnCO$_3$ |
| III-1 | Balance | 18 | 7 | 0 | 0 | 30 | 1 | 0 | 4 | 8 | 0 |
| III-2 | Balance | 12 | 12 | 1 | 0 | 3 | 0 | 2 | 3 | 10 | 1 |
| III-3 | Balance | 6 | 15 | 0 | 0 | 8 | 0.2 | 1.5 | 2.5 | 7.5 | 1.5 |
| III-4 | Balance | 5 | 16 | 1 | 3 | 12 | 0.3 | 1.9 | 3 | 8 | 1 |
| III-5 | Balance | 12 | 10 | 0 | 0 | 9 | 0.5 | 1 | 3.5 | 7.5 | 0.5 |
| III-6 | Balance | 10 | 20 | 1 | 2 | 10 | 0.3 | 2.5 | 3 | 9 | 2.5 |
| III-7 | Balance | 10 | 8 | 0 | 5 | 8 | 0.1 | 1 | 2.5 | 7.5 | 1.5 |
| *III-8 | Balance | 12 | 16 | 0 | 0 | 10 | 0.2 | 2.4 | 3 | 8 | 1 |
| *III-9 | Balance | 8 | 6 | 2 | 0 | 11 | 0.5 | 0 | 3 | 7 | 0 |
| *III-10 | Balance | 12 | 15 | 1 | 0 | 11 | 0 | 2 | 2 | 8 | 0.5 |
| *III-11 | Balance | 4 | 15 | 0 | 2 | 10 | 0.5 | 0.7 | 5 | 5.5 | 2 |
| *III-12 | Balance | 12 | 12 | 1 | 0 | 8 | 0.1 | 2 | 2 | 6 | 0 |
| *III-13 | Balance | 12 | 12 | 2 | 0 | 8 | 0.2 | 2 | 4 | 8 | 1 |
| *III-14 | Balance | 5 | 11 | 1 | 1 | 9 | 0.3 | 1.3 | 3 | 7 | 0.5 |

Mark* indicates sample out of range of this invention.

TABLE 6

| | Step (c) | | | | Step (d) | | | |
|---|---|---|---|---|---|---|---|---|
| | Atmosphere in heating | | Heating | Sintering | Sintering | Atmosphere in heating | | Heating | Sintering | Sintering |
| Sample No. | Atmosphere | Pressure (Pa) | rate (° C./min.) | temperature (° C.) | time (hr) | Atmosphere | Pressure (Pa) | rate (° C./min.) | temperature (° C.) | time (hr) |
| III-1 | N$_2$ | 1000 | 10 | 1400 | 0.5 | N$_2$ | 1500 | 15 | 1550 | 1 |
| III-2 | N$_2$ | 1500 | 7 | 1450 | 0.8 | N$_2$ | 2000 | 8 | 1550 | 0.7 |
| III-3 | N$_2$ | 1000 | 7 | 1500 | 0.5 | N$_2$ | 1000 | 7 | 1575 | 1 |
| III-4 | N$_2$ | 1500 | 10 | 1500 | 0.5 | N$_2$ | 800 | 8 | 1575 | 0.5 |
| III-5 | N$_2$ | 800 | 6.5 | 1450 | 1 | N$_2$ | 1200 | 10 | 1550 | 0.8 |
| III-6 | N$_2$ | 1800 | 8 | 1450 | 1 | N$_2$ | 700 | 5 | 1575 | 0.5 |
| III-7 | N$_2$ | 100 | 12 | 1500 | 1 | N$_2$ | 100 | 7 | 1600 | 0.6 |
| *III-8 | Vacuum | | 7 | 1500 | 0.5 | Vacuum | | 7 | 1575 | 1 |
| *III-9 | N$_2$ | 800 | 7 | 1550 | 1 | N$_2$ | 800 | 7 | 1650 | 1 |
| *III-10 | N$_2$ | 1000 | 10 | 1380 | 1 | N$_2$ | 1000 | 8 | 1450 | 0.5 |
| *III-11 | N$_2$ | 5000 | 10 | 1500 | 1 | N$_2$ | 5000 | 6.5 | 1575 | 0.5 |
| *III-12 | N$_2$ | 1000 | 8 | 1500 | 2 | N$_2$ | 1000 | 8 | 1600 | 2 |
| *III-13 | N$_2$ | 1000 | 7 | 1500 | 0.5 | N$_2$ | 1000 | 3.5 | 1575 | 0.5 |
| *III-14 | N$_2$ | 800 | 7 | 1500 | 0.5 | N$_2$ | 900 | 16 | 1575 | 0.6 |

Mark* indicates sample out of range of this invention.

The flank face of each of these obtained sintered cermets was ground 0.5 mm in thickness into a mirror surface state.

depth of 20 μm to 80 μm with reference to the surface of the sintered cermet. The results were shown in Table 7.

TABLE 7

| | XRD peak of TiCN(220) surface | | | | | | | | | | | |
|---|---|---|---|---|---|---|---|---|---|---|---|---|
| | Surface portion | | | | Modified portion | | | | | Interior | | |
| Sample No. | Low-angle-side | Intermediate-position | High-angle-side | P1/P2 | Low-angle-side | Intermediate-position | High-angle-side | Δ1[1)] | Δ2[2)] | Low-angle-side | Intermediate-position | High-angle-side |
| III-1 | Presence | Presence | Presence | 0.89 | Presence | Presence | Presence | 0.2 | 0.3 | Presence | Absence | Presence |
| III-2 | Presence | Presence | Presence | 0.92 | Presence | Presence | Presence | 0.19 | 0.48 | Presence | Absence | Presence |

TABLE 7-continued

| | XRD peak of TiCN(220) surface | | | | | | | | | | | |
|---|---|---|---|---|---|---|---|---|---|---|---|---|
| | Surface portion | | | | Modified portion | | | | | Interior | | |
| Sample No. | Low-angle-side | Intermediate-position | High-angle-side | P1/P2 | Low-angle-side | Intermediate-position | High-angle-side | $\Delta_1$ [1] | $\Delta_2$ [2] | Low-angle-side | Intermediate-position | High-angle-side |
| III-3 | Presence | Presence | Absence | 2.29 | Presence | Presence | Presence | 0.15 | 0.4 | Presence | Absence | Presence |
| III-4 | Presence | Presence | Absence | 1.51 | Presence | Presence | Presence | 0.16 | 0.42 | Presence | Absence | Presence |
| III-5 | Presence | Presence | Presence | 1.35 | Presence | Presence | Presence | 0.17 | 0.37 | Presence | Absence | Presence |
| III-6 | Presence | Presence | Absence | 1.91 | Presence | Presence | Presence | 0.11 | 0.46 | Presence | Absence | Presence |
| III-7 | Presence | Presence | Presence | 1.01 | Presence | Presence | Presence | 0.13 | 0.32 | Presence | Absence | Presence |
| *III-8 | Presence | Presence | Absence | 2.03 | Presence | Presence | Presence | 0.31 | 0.26 | Presence | Presence | Presence |
| *III-9 | Presence | Presence | Absence | 2.96 | Presence | Presence | Presence | 0.4 | 0.49 | Presence | Presence | Presence |
| *III-10 | Presence | Absence | Presence | — | | | | | | Presence | Absence | Presence |
| *III-11 | Presence | Absence | Presence | — | | | | | | Presence | Absence | Presence |
| *III-12 | Presence | Presence | Absence | 0.73 | Presence | Presence | Presence | 0.26 | 0.55 | Presence | Presence | Presence |
| *III-13 | Presence | Presence | Absence | 2.34 | Presence | Presence | Presence | 0.22 | 0.43 | Presence | Presence | Presence |
| *III-14 | Presence | Presence | Absence | 0.47 | Presence | Absence | Presence | — | — | Presence | Absence | Presence |

Mark* indicates sample out of range of this invention.

[1] $\Delta_1$ indicates a space between a diffraction angle of the low-angle-side peak and a diffraction angle of the intermediate-position peak.

[2] $\Delta_2$ indicates a space between a diffraction angle of the intermediate-positon peak and a diffraction angle of the high-angle-side peak.

Next, cutting tests using these obtained cermet cutting tools were conducted under the following cutting conditions. The results were collectively shown in Table 8.

(Wear Resistance Evaluation)

Workpiece: SCM435

Cutting speed: 200 m/min

Feed rate: 0.20 mm/rev

Depth of cut: 1.0 mm

Cutting state: Wet (using water-soluble cutting fluid)

Evaluation method: Time elapsed until the amount of wear reached 0.2 mm (Chipping Resistance Evaluation)

Workpiece: S45C

Cutting speed: 120 m/min

Feed rate: 0.05 mm/rev or more

Depth of cut: 1.5 mm

Cutting state: Dry

Evaluation method: Time (sec) elapsed until chipping occurred by each feed rate 10 S

TABLE 8

| | Cutting properties | |
|---|---|---|
| Sample No. | Chipping resistance (sec.) | Wear resistance (min.) |
| III-1 | 66 | 88 |
| III-2 | 67 | 93 |
| III-3 | 82 | 126 |
| III-4 | 80 | 118 |
| III-5 | 77 | 105 |
| III-6 | 78 | 112 |
| III-7 | 63 | 108 |
| *III-8 | 40 | 98 |
| *III-9 | 52 | 89 |
| *III-10 | 63 | 68 |
| *III-11 | 69 | 58 |
| *III-12 | 36 | 91 |

TABLE 8-continued

| | Cutting properties | |
|---|---|---|
| Sample No. | Chipping resistance (sec.) | Wear resistance (min.) |
| *III-13 | 46 | 85 |
| *III-14 | 47 | 52 |

Mark* indicates sample out of range of this invention.

It was noted from Tables 5 to 8 that Samples Nos. III-8 to III-14, in which there were no modified part having three peaks, or the interior also had three peaks, had insufficient wear resistance or chipping resistance, failing to obtain sufficient tool life.

On the other hand, Samples Nos. III-1 to III-7, each having an XRD peak within the present invention, exhibited excellent wear resistance and excellent chipping resistance, achieving superior tool life.

Example 4

Cermet tools of Samples Nos. IV-1 to IV-13 were manufactured by forming a hard layer of a film construction and under film-forming conditions in Table 9, on the sintered cermets in Example 3, by using arc ion plating method.

Cutting tests using these obtained cermet cutting tools were conducted under the following cutting conditions. The results were collectively shown in Table 9.

(Wear Resistance Evaluation)

Workpiece: SCM435

Cutting speed: 300 m/min

Feed rate: 0.25 mm/rev

Depth of cut: 1.0 mm

Cutting state: Wet (using water-soluble cutting fluid)

Evaluation method: Time elapsed until the amount of wear reached 0.2 mm (Chipping Resistance Evaluation)

Workpiece: 545C

Cutting speed: 130 m/min

Feed rate: 0.05 mm/rev or more

Depth of cut: 2.0 mm

Cutting state: Dry

Evaluation method: Time (sec) elapsed until chipping occurred by each feed rate 10 S

TABLE 9

| Sample No. | Coating layer (Coating layer A) | | Layer thickness (μm) | Cutting properties | |
| --- | --- | --- | --- | --- | --- |
| | Composition | | | Chipping resistance (sec.) | Wear resistance (min.) |
| IV-1 | $Ti_{0.42}Al_{0.48}W_{0.04}Si_{0.03}Nb_{0.03}N$ | TiN | 3.0 | 76 | 109 |
| IV-2 | $Ti_{0.46}Al_{0.49}W_{0.02}Si_{0.01}Nb_{0.02}N$ | — | 1.5 | 72 | 114 |
| IV-3 | $Ti_{0.50}Al_{0.50}N$ | TiN | 3.0 | 85 | 136 |
| IV-4 | $Ti_{0.42}Al_{0.49}Nb_{0.09}N$ | TiCN | 3.0 | 83 | 132 |
| IV-5 | $Ti_{0.50}Al_{0.50}N$ | — | 1.0 | 83 | 128 |
| IV-6 | $Ti_{0.50}Al_{0.50}N$ | — | 4.0 | 86 | 131 |
| IV-7 | $Ti_{0.42}Al_{0.49}Nb_{0.09}N$ | — | 3.0 | 74 | 134 |
| *IV-8 | $Ti_{0.40}Al_{0.40}Cr_{0.20}N$ | — | 3.0 | 45 | 105 |
| *IV-9 | $Ti_{0.50}Al_{0.50}N$ | — | 1.0 | 58 | 93 |
| *IV-10 | $Ti_{0.46}Al_{0.49}W_{0.02}Si_{0.01}Nb_{0.02}N$ | — | 1.5 | 68 | 72 |
| *IV-11 | TiCN | — | 3.0 | 72 | 62 |
| *IV-12 | $Ti_{0.46}Al_{0.49}Si_{0.03}Cr_{0.02}N$ | — | 1.0 | 42 | 93 |
| *IV-13 | $Ti_{0.50}Al_{0.50}N$ | — | 3.0 | 54 | 89 |
| *IV-14 | $Ti_{0.45}Al_{0.45}Cr_{0.10}N$ | — | 1.0 | 55 | 64 |

Mark* indicates sample out of range of this invention.

It was noted from Table 9 that in Samples Nos. IV-8 to IV-14, each having residual stress outside the range of the present invention, the toughness of these tools was not sufficient, and chipping of the cutting edge and sudden fracture of the cutting edge occurred early, failing to obtain sufficient tool life. On the other hand, Samples Nos. IV-1 to IV-7 within the range of the present invention had high toughness, and the cutting edge had no chipping, thereby exhibiting excellent tool life.

The invention claimed is:

1. A sintered cermet, comprising:
a hard phase composed mainly of TiCN and at least one of carbides, nitrides, and carbonitrides of one or more metals belonging to Groups 4, 5, and 6 of the periodic table and
a binder phase composed mainly of Ni and Co,
wherein, the binder phase comprises two crystal lattice constants B1 and B2 at a point 0.5 mm below a surface in an interior of the sintered cermet.

2. The sintered cermet according to claim 1, wherein a difference between the B1 and the B2 is 0.01 Å or above.

3. The sintered cermet according to claim 2, wherein the B1 is 3.575 Å or above and below 3.585 Å, and the B2 is 3.585 Å or above and 3.600 Å or below.

4. The sintered cermet according to claim 1, wherein a binder phase existing in a surface of the sintered cermet has the crystal lattice constant B1.

5. A cutting tool, comprising:
a cutting edge, which is composed of the sintered cermet according to claim 1, or which is composed of the sintered cermet according to claim 1 with a coating layer formed on a surface thereof.

* * * * *